(12) United States Patent
Cavallin et al.

(10) Patent No.: US 7,726,726 B2
(45) Date of Patent: Jun. 1, 2010

(54) ENERGY-ABSORBING SYSTEM FOR VEHICLE DOOR ASSEMBLY

(75) Inventors: Benjamin E. Cavallin, Rochester Hills, MI (US); Gaurav Sharma, Troy, MI (US); David N. Allen, Grand Rapids, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 165 days.

(21) Appl. No.: 12/033,435

(22) Filed: Feb. 19, 2008

(65) Prior Publication Data

US 2009/0206630 A1  Aug. 20, 2009

(51) Int. Cl.
*B60J 5/04* (2006.01)

(52) U.S. Cl. .............. 296/187.05; 296/153; 296/146.7; 296/187.12

(58) Field of Classification Search ................. 296/153, 296/146.6, 146.7, 187.05, 187.12; 49/502
See application file for complete search history.

(56) References Cited

U.S. PATENT DOCUMENTS

| | | | | |
|---|---|---|---|---|
| 4,783,114 A | * | 11/1988 | Welch | 296/153 |
| 6,149,224 A | * | 11/2000 | Tiberia et al. | 296/146.7 |
| 7,032,955 B2 | * | 4/2006 | Radu et al. | 296/146.7 |
| 7,549,689 B2 | * | 6/2009 | Pinkerton et al. | 296/1.02 |
| 2006/0061134 A1 | * | 3/2006 | DeLong et al. | 296/146.7 |
| 2007/0246968 A1 | * | 10/2007 | Gokhale et al. | 296/153 |
| 2008/0272614 A1 | * | 11/2008 | Hall et al. | 296/146.7 |
| 2009/0134659 A1 | * | 5/2009 | Hall et al. | 296/146.7 |
| 2009/0200831 A1 | * | 8/2009 | Motowski et al. | 296/153 |

* cited by examiner

*Primary Examiner*—Jason S Morrow
(74) *Attorney, Agent, or Firm*—Quinn Law Group, PLLC (57) ABSTRACT

An energy-absorbing system for vehicle door assemblies is provided, including first and second brackets and a reaction plate. Each bracket attaches to an inner support panel of the door assembly via a mounting portion having leg members extending inward from opposing ends thereof. The reaction plate includes a generally planar portion with a flange portion extending from an upper edge thereof. One side of the reaction plate is attached to an inner surface of a trim panel, whereas the other side is attached to the leg members of the first and second brackets. One section of the flange portion abuts against an underside surface of an armrest assembly, and another section abuts against a b-side surface of a pull-handle. Both brackets are configured to sustain a minimum vertical loading condition (limit vertical deflection), and controllably deform under a threshold lateral loading condition to absorb and attenuate kinetic energy resulting therefrom.

20 Claims, 3 Drawing Sheets

ENERGY-ABSORBING SYSTEM FOR VEHICLE DOOR ASSEMBLY

TECHNICAL FIELD

The present invention relates generally to door assemblies for motorized vehicles, and more specifically to systems for limiting the vertical deflection of vehicle door armrest assemblies, while allowing for deformation of the door trim assembly under predetermined lateral loading conditions to absorb and attenuate resultant kinetic energy.

BACKGROUND OF THE INVENTION

Most motorized vehicles include an armrest that extends from the interior surface of each vehicle door assembly. The armrest is typically part of a decorative trim assembly on the inner panel of the door assembly, and is often integrated with a door latch release lever and a pull-handle or pull-cup feature used to open and close the door assembly. The majority of conventional armrest assemblies are self-contained units that are adapted to be positively attached to the door inner panel or other structural components of the vehicle by, for example, fasteners, bolts, push pins, or heat stakes. The armrest is intended, in part, to provide a surface on which a vehicle occupant seated adjacent the door may rest the lower extremities of his or her arm.

A door pull-handle or pull-cup feature is typically employed to pull a vehicle door assembly from an open position to a closed position once the occupant has entered the vehicle, and vice-versa while the occupant alights from the vehicle. The door pull-handle or pull-cup feature can also be used as a support surface for the occupant, which can occur, for example, during ingress/egress to a truck, van, or large sport utility vehicle (SUV) where the passenger compartment is often positioned above the waist line of a typical occupant. Similarly, the armrest assembly may be used as a standing platform for access to the vehicle roof. Depending upon the degree of reliance by the occupant on the armrest assembly as a support, as well as the occupant's mass and manner of loading the armrest assembly, it is possible that substantial vertical and horizontal loads can be generated on the armrest assembly and pull-handle/pull-cup feature.

Armrest assemblies are often relatively rigid and structurally robust in order to withstand horizontal and vertical loads applied during everyday use of the vehicle. However, the deformability of the armrest and, correspondingly, the armrest's ability to absorb kinetic energy imparted thereto is diminished as the rigidity of the armrest is increased. In contrast, the armrest may be constructed using softer, more compliant materials so that it will yield or deform under the force of impact with a foreign or local object. However, the resiliency and durability of the armrest assembly for normal use may diminish with an overly compliant construction. Ideally, the armrest should deform in a manner to absorb the impact energy imparted thereto, while maintaining a sufficiently resilient and robust configuration for everyday use purposes.

SUMMARY OF THE INVENTION

The present invention provides a completely integrated energy-absorbing system for vehicle door assemblies, namely the trim structure, armrest, and pull-handle or pull-cup feature. An energy-absorbing system according to the present invention assists the trim structure and armrest in deforming and, thus, absorbing energy in a controlled manner during dynamic lateral loading. Yet, the present design supports quasi-static vertical and lateral loading resulting from everyday use. That is, an energy-absorbing system according to the present invention limits vertical deflection of the armrest assembly, and also limits lateral deflection of the trim structure and armrest assembly when pushing or pulling on the pull-handle/pull-cup feature.

According to one embodiment of the present invention, an energy-absorbing bracket system for use with a vehicle door assembly is provided. The door assembly includes an inner support panel, a trim panel member, and an armrest assembly with either a pull-handle or pull-cup feature. The energy-absorbing bracket system includes first and second spaced bracket members, each having a generally vertical mounting portion configured to attach to an inboard surface of the inner support panel. Leg members extend inward from each mounting portion, preferably in a looping or arcuate manner from opposing ends thereof. Each leg member is configured to operatively engage an inner surface of the trim panel member. The first and second bracket members are configured to sustain a predetermined minimum vertical loading condition. The first and second bracket members are also configured to controllably deform under a predetermined threshold lateral loading condition to absorb and attenuate kinetic energy resulting therefrom.

Ideally, the first and second bracket members are oriented substantially parallel to one another, and positioned laterally adjacent a predetermined countermeasure or occupant zone. In addition, the first and second bracket members are preferably configured to be variably tunable to provide different predetermined levels of kinetic energy absorption and attenuation. Finally, it is desirable that each bracket member consists essentially of a single-piece, elongated metallic member.

The energy-absorbing bracket system also includes a reaction plate member having a generally planar portion with opposing first and second surfaces. The bracket leg members are attached to the first surface of the reaction plate member, whereas the second surface is configured to attach to the inner surface of the trim panel member underneath the armrest assembly. A flange portion extends from an upper peripheral edge of the planar portion such that a first section of the flange portion abuts against a b-side surface of the pull-handle and a second section abuts against an underside surface of the armrest assembly. The reaction plate preferably defines at least one aperture therethrough with a second flange portion extending from an inner peripheral edge thereof. The second flange portion abuts against a generally horizontal portion of the inner surface of the trim panel member.

The reaction plate member preferably consists essentially of a preformed single-piece metallic panel. The reaction plate member may include a plurality of structural features, such as indentations or slots, which are operatively configured to weaken or strengthen the planar portion of the reaction plate at preselected locations. Ideally, the reaction plate member is configured to attach at a longitudinally rearward end of the trim panel member, laterally adjacent to the predetermined occupant zone.

The energy-absorbing bracket system preferably also includes a mounting bracket intermediate the inner support panel of the door assembly and the first and second bracket members. The mounting bracket is configured for operatively attaching the first and second bracket members to the inboard surface of the inner support panel.

According to an additional embodiment of the present invention, a door assembly is provided that is secured, hinged, or attached to the body of a motorized vehicle to selectively transition from a closed position to an open position. The door assembly includes an inner support panel with a trim panel member operatively attached thereto. Additionally, an armrest assembly is disposed vertically adjacent the trim panel member, and elongated longitudinally along the inner support panel relative to the vehicle and extends inward therefrom. The armrest assembly includes a pull-handle feature defining an internal cavity therein.

The door assembly also includes a reaction plate member having a generally planar portion with opposing first and second surfaces. The second surface is attached to an inner surface of the trim panel member. Ideally, the planar portion includes a first flange portion extending from an upper peripheral edge thereof. In this instance, a first section of the flange portion abuts against a b-side surface of the pull-handle internal cavity, whereas a second section of the flange portion abuts against an underside surface of the armrest assembly.

Also included is a first bracket member having a first generally vertical mounting portion with first and second leg members extending inward in an arcuate or looping manner from opposing ends thereof. The first bracket member is attached to the first surface of the reaction plate member via the first and second leg members. A second bracket member, which is longitudinally spaced from and substantially parallel to the first bracket member, has a second generally vertical mounting portion with third and fourth leg members extending inward in an arcuate manner from opposing ends thereof. The second bracket member is attached to the first surface of the reaction plate member via the third and fourth leg members. The reaction plate member is preferably attached at a longitudinally rearward end of the trim panel member such that the reaction plate member and the first and second brackets are positioned laterally adjacent a predetermined occupant zone.

A mounting bracket is positioned between the inner support panel and the first and second bracket members. The mounting bracket attaches the respective mounting portions of the first and second bracket members to the inboard surface of the inner support panel. The first and second bracket members are configured to sustain a predetermined minimum vertical loading condition (e.g., minimize vertical deflection of the armrest assembly). The first and second bracket members are also configured to controllably deform under a predetermined threshold lateral loading condition to absorb and attenuate kinetic energy resulting therefrom.

According to another additional embodiment of the present invention, a motorized vehicle is provided. A door assembly is attached to the vehicle to selectively transition from a closed position to an open position. The door assembly includes an inner support panel with a trim panel operatively attached thereto. An armrest assembly is attached or mounted to the door assembly inner support panel and extends inward therefrom. The armrest assembly has a pull-handle with an internal cavity.

The vehicle also includes a reaction plate member having a generally planar portion with opposing first and second surfaces. The reaction plate member is attached to the inner surface of the trim panel member along the second surface. The planar portion of the reaction plate member includes a flange portion extending from an upper peripheral edge thereof. A first section of the flange portion abuts against a b-side surface of the pull-handle internal cavity, whereas a second section of the flange portion abuts against an underside surface of the armrest assembly.

Also included is a first bracket member having a first generally vertical mounting portion with first and second leg members extending inward in an arcuate or looping manner from opposing ends thereof. The first bracket member is attached to the first surface of the reaction plate member via the first and second leg members. A second bracket member, which is longitudinally spaced from and substantially parallel to the first bracket member, has a second generally vertical mounting portion with third and fourth leg members extending inward in an arcuate manner from opposing ends thereof. The second bracket member is attached to the first surface of the reaction plate member via the third and fourth leg members.

A mounting bracket is positioned between the inner support panel and the first and second bracket members. The mounting bracket attaches the respective mounting portions of the first and second bracket members to the inboard surface of the inner support panel. The first and second bracket members are configured to sustain a predetermined minimum vertical loading condition. The first and second bracket members are also configured to controllably deform under a predetermined threshold lateral loading condition to absorb and attenuate kinetic energy resulting therefrom. In addition, the reaction plate member is attached at a longitudinally rearward end of the trim panel member such that the reaction plate member and the first and second brackets are positioned laterally adjacent a predetermined occupant zone.

The above features and advantages, and other features and advantages of the present invention, will be readily apparent from the following detailed description of the preferred embodiments and best modes for carrying out the present invention when taken in connection with the accompanying drawings and appended claims.

DESCRIPTION OF THE PREFERRED EMBODIMENTS

Figure 1:
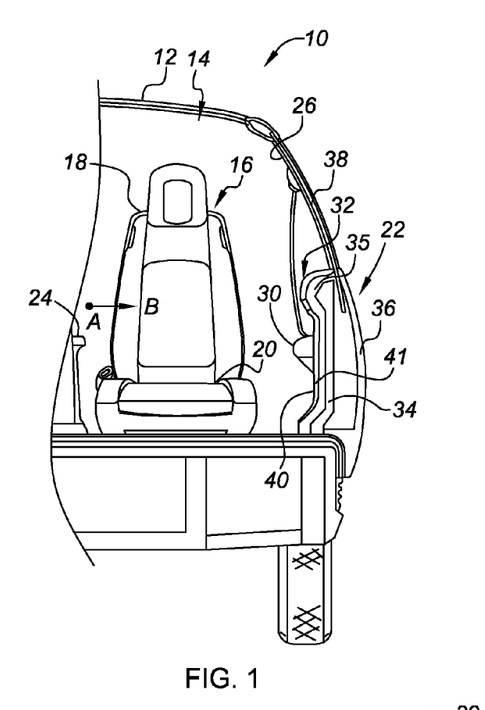
FIG. 1 is a schematic partially cut-away front-view illustration of a portion of a representative motorized vehicle with an energy-absorbing bracket system in accordance with the present invention mounted therein.

Referring to the drawings, wherein like reference numbers refer to like components throughout the several views, FIG. 1 is a partially cut-away front-view illustration of a portion of a representative motorized vehicle, identified generally as 10, with which the present invention may be utilized. It should be readily understood that FIG. 1 is merely an exemplary application by which the present invention may be practiced. As such, the present invention is by no means limited to the vehicle configuration of FIG. 1. For example, although the vehicle 10 is depicted in FIG. 1 as a standard passenger car, the present invention can be incorporated into any vehicle platform, such as, but not limited to, sport utility vehicles, light trucks, heavy duty vehicles, minivans, buses, convertibles, etc. Finally, the drawings presented herein, i.e., FIGS. 1 through 4, are not to scale and are provided purely for instructional purposes. Thus, the specific and relative dimensions shown in the drawings are not to be considered limiting.

The vehicle 10 has a vehicle body 12 including a vehicle interior, shown in part in FIG. 1 as passenger compartment 14, having one or more vehicle seat assemblies 16 therein. Each seat assembly 16 can be of any suitable or conventional construction, but generally includes a backrest portion 18 and a lower cushion portion 20. The vehicle 10 also includes a plurality of door assemblies 22 (only one of which is shown in FIG. 1) that is operatively secured to the vehicle body 12 in a manner sufficient to allow each vehicle door assembly 22 to transition from a substantially closed position (as shown in FIG. 1) to a generally open position (not shown), e.g., via vertical hinges or by a mechanical or automated track-and-sled mechanism (not depicted herein). An armrest assembly 30 is preferably mounted to the vehicle door assembly 22, but may also be mounted directly to one of the vehicle seat assemblies 16, to a console 24 located within the passenger compartment 14, to an interior panel or substrate, represented in FIG. 1 by vehicle interior surface 26, or any combination thereof. The vehicle body 12 has a longitudinal axis A that extends along the length of the vehicle body 10, generally perpendicular to a lateral axis B.

Looking still to FIG. 1, the vehicle door assembly 22 also includes a door trim assembly 32 mounted, secured, or attached to a door inner or interior support panel 34 adjacent the passenger compartment 14. The door inner panel 34 is secured to a reinforcing subassembly (not shown) by mechanically fastening portions of the interior panel 34 to the door reinforcing assembly (e.g., clinching), to oppose a door outer or exterior panel 36. The door inner panel 34 is mounted such that it is substantially parallel to and inboard from the door exterior panel 36 to thereby operatively house a power or manually operated window pane 38 therebetween.

The inner and outer door panels 34, 36 are part of the load bearing structure of the door assembly 22. As such, each door panel 34, 36 is preferably manufactured (e.g., punched, pressed, hydroformed, etc.) from a material known to have a suitable strength for the intended use of the vehicle door assembly 22, such as a rigid plastic polymer (e.g., Polymethyl methacrylate or PMMA, or bulk mold compound or BMC), a metallic material (e.g., cold rolled steel, hot dipped galvanized steel, stainless steel, aluminum, and the like), or a combination thereof, and may be finished with an anti-corrosive, highly durable coating (e.g., zinc plating). The door inner panel 34 can be covered by a foam material or padding 35, followed by the door trim assembly 32, which in turn is preferably covered, for example, by a decorative cloth, leather, or vinyl 41.

The armrest assembly 30 is preferably of sufficient length and width to provide support for most of the forearm (e.g., from the elbow to the wrist) of a vehicle occupant (not shown) immediately adjacent the door assembly 22. The armrest assembly 30 is preferably fabricated from a material typical for armrests. For example, the armrest assembly 30 is preferably made from a plastic composite, covered by a foam material or padding, and concealed with a decorative cloth, leather, vinyl, or plastic. The armrest assembly 30 includes a pull-handle or pull-cup feature 28, FIG. 2, which, once assembled to the door assembly 22 is oriented laterally inboard relative to the door inner panel 34 and, thus, the vehicle interior surface 26, FIG. 1. The pull-handle feature 28 of the armrest assembly 30 defines an aperture or cavity 29 therein, the cavity having an underside or "b-side" surface 31 (as seen in FIG. 2B). A cavity 39 is provided at a forward end of the armrest assembly 30. The cavity 39 is dimensioned to receive an electrical switch assembly or "switch pack" 51, FIG. 2A, of the type for actuating various vehicle electrical components—e.g., for opening and closing windows, such as window pane 38, for locking and unlocking doors, such as vehicle door assembly 22, and for selecting and manipulating either a left- or right-side rearview mirror (not shown) for adjustment.

Figure 2:
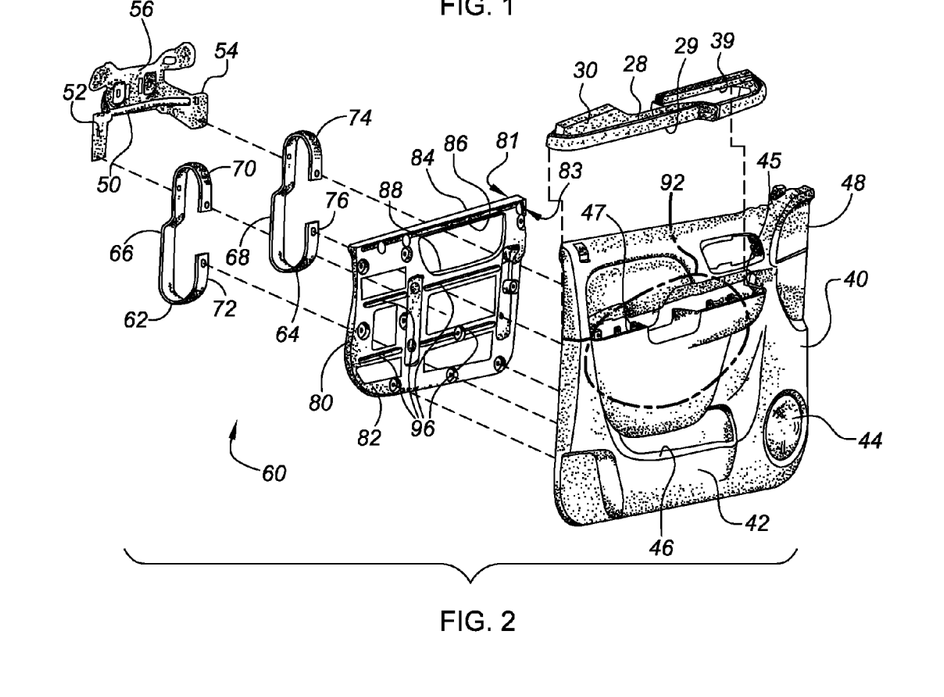
FIG. 2 is an exploded perspective view of an energy-absorbing bracket system in accordance with one embodiment of the present invention.
Figure 2A:
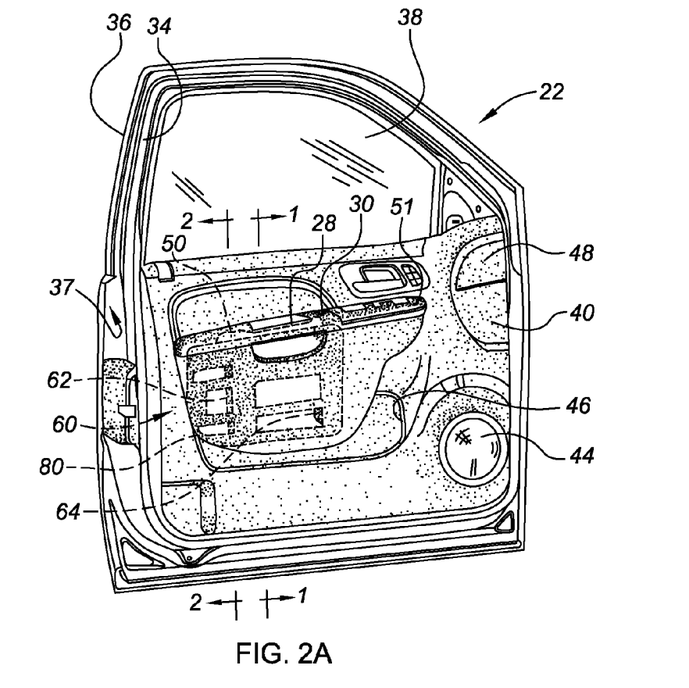
FIG. 2A is a perspective view of the vehicle door assembly of FIG. 1 with the energy-absorbing bracket system of FIG. 2 mounted thereto.
Figure 2B:
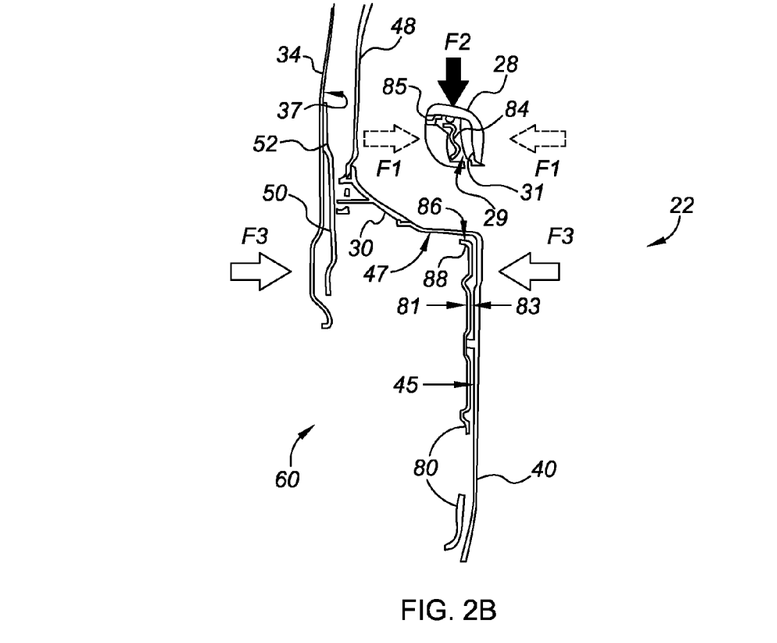
FIG. 2B is a cross-sectional view of the vehicle door assembly and energy-absorbing bracket system taken along line 1-1 of FIG. 2A.

Referring to FIGS. 1 through 2A, the trim panel assembly 32 includes various non-load bearing sub-components. For example, as shown in FIG. 2A, a lower trim panel portion 40 is attached to an inner or inboard surface 37 of the door interior panel 34 (e.g., by fasteners, rivets, or like elements). Once assembled, the lower trim panel portion 40 protrudes into the passenger compartment 14 (as best seen in FIG. 1). The lower trim panel portion 40 may include certain optional features, such as a lower kick-guard portion 42, an audio speaker 44, and a pocket or cubby hole 46, FIG. 2. An upper trim panel portion 48 attaches to the inner surface 37 of the interior panel 34 immediately vertically proximate to the lower trim panel portion 40. An upper trim panel portion 48 attaches to the interior panel 34 vertically proximate to the lower trim panel portion 40.

A mounting bracket member 50 is secured in a generally form-fitting manner by, for example, one or more bolts 90 (FIG. 2C), to inner surface 37 of the inner panel 34, generally facing the passenger compartment 14 (FIG. 1). It is also contemplated that the mounting bracket 50 be integrally formed with the inner panel 34 of the vehicle door assembly 22. As will be described in extensive detail hereinbelow, the mounting bracket 50 is configured to mate with and receive an energy-absorbing bracket system 60, both of which are intended to be located between the trim panel assembly 32 and the door inner panel 34.

FIG. 2 of the drawings provides an exploded perspective view of the energy-absorbing bracket system 60 in accordance with one embodiment of the present invention. The energy-absorbing bracket system 60 includes first and second bracket members 62 and 64, respectively. The first bracket member 62 has a C-shaped configuration, including a first generally vertical mounting portion 66 and first and second leg members 70 and 72, respectively. Each of the leg members 70, 72 preferably extends inward relative to the vehicle 10 (FIG. 1) in an arcuate or looping manner from opposing ends of the mounting portion 66. In a similar respect, the second bracket member 64 has a C-shaped configuration, including a second generally vertical mounting portion 68 and first and second leg members 74 and 76, respectively. Each of the leg members 74, 76 preferably extends inward relative to the vehicle 10 (FIG. 1) in an arcuate manner from opposing ends of the mounting portion 68.

Each mounting portion 66, 68 is configured for operative attachment to the inboard surface 37 of the inner support panel 34. Specifically, the first and second mounting portions 66, 68 are respectively attached (e.g., via bolts 90 of FIG. 2C) to first and second stepped surfaces or flanges 52 and 54, respectively, which extend laterally outward from a central base portion 56 of the mounting bracket 50. As seen in FIG. 2A, the central base portion 56 of the mounting bracket 50 is mounted (e.g., via bolts or clips) to the inner surface 37 of the door inner panel 34. According to preferred practice, the first and second bracket members 62, 64 are longitudinally spaced from one another (i.e., relative to axis A), and substantially parallel. As will be understood from the following discussion, each leg member 70-76 is configured to operatively engage, via reaction plate 80, with an inner surface of the trim panel assembly 32.

Each bracket member 62, 64 preferably consists of a single-piece, elongated metallic member. However, each bracket member 62, 64 may comprise multiple constituent parts of varying dimensions and materials that are subsequently assembled or attached to one another. In a similar respect, although depicted in FIG. 2 as structurally identical, the first and second bracket members 62, 64 may have differing configurations without departing from the intended scope of the present invention. It should also be recognized the energy-absorbing bracket system 60 may include more than two bracket members without departing from the scope of the claimed invention.

Figure 2C:
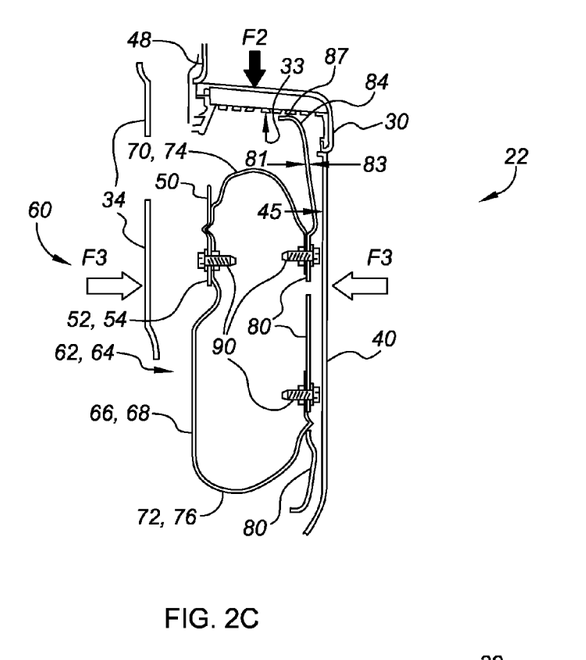
FIG. 2C is a cross-sectional view of the vehicle door assembly and energy-absorbing bracket system taken along line 2-2 of FIG. 2A.

The first and second bracket members 62, 64 are configured to sustain a predetermined minimum vertical loading condition (depicted in FIGS. 2B-C for illustrative purposes by shaded arrow F2), and controllably deform under a predetermined threshold lateral loading condition (represented in FIGS. 2B-C by arrows F3 for explanatory purposes). For example, first and second bracket members 62, 64 provide sufficient structural rigidity for normal, quasi-static loading purposes—e.g., to maintain at least 250 to 500 Newtons (N) vertical loading (e.g., F2) and 300N horizontal loading (e.g., F1), but will controllably deform or collapse under atypical or dynamic loading scenarios—e.g., a large lateral crush force (e.g., F3). As such, a support bracket system according to the present design provides a completely integrated energy-absorbing system for vehicle door assemblies. In addition, an energy-absorbing system according to the present invention assists the armrest assembly 30 and trim structure 32 in deforming and, thus, absorbing kinetic energy in a controlled manner during dynamic lateral loading.

The energy-absorbing bracket system 60 also includes a reaction plate member 80 that is configured to mate with, attach to, and reinforce the armrest assembly 30 and door trim assembly 32 of FIGS. 1 and 2. The reaction plate member 80 includes a generally planar portion 82 with a first, outboard surface 81 opposing a second, inboard surface 83, offset of the inner surface of the trim panel 45. The first and second bracket member 62, 64, namely first, second, third and fourth leg members 70-76 are configured to abut against and attach to the first surface 81 of the reaction plate member 80 (e.g., via bolts 90 of FIG. 2C). In addition, the second surface 83 is dimensioned and configured to abut against, mate with, and attach to the trim panel assembly 32, namely inner surface 45 of the trim panel lower portion 40 (e.g., via heat stakes). Ideally, the reaction plate member 80 consists essentially of a preformed single-piece metallic panel. However, the reaction plate member 80 may consist of several constituent components attached to one or both of the bracket members 62, 64. In addition, the structural characteristics (depth, width, height, number of apertures, etc.) of the reaction plate member 80 may be selectively altered depending upon the intended application of the energy-absorbing bracket system 60, as will be understood when taken in connection with the discussion of the embodiment presented in FIG. 3.

Referring now to FIG. 2B, a cross-sectional view of the vehicle door assembly 22 and energy-absorbing bracket system 60 taken along line 1-1 of FIG. 2A is provided. The reaction plate member 80, illustrated in FIGS. 2 and 2B, includes a first flange portion 84 extending from an upper peripheral edge of the planar portion 82. As seen in FIG. 2B, a first section 85 of the first flange portion 84 abuts against the b-side surface 31 of the internal cavity 29 of the pull-handle 28. The reaction plate member 80 also defines one or more apertures therethrough. Of particular importance, the reaction plate 80 defines an aperture 86 with a second flange portion 88 extending from an inner peripheral edge thereof. The aperture 86 is oriented and dimensioned such that the second flange portion 88 of the reaction plate member 80 abuts against a generally horizontal portion 47 of the inner surface 45 of the lower trim panel portion 40. In so doing, the energy-absorbing bracket system 60 according to the present embodiment is able to limit vertical deflection of the pull-handle feature 28 and armrest assembly 30, and is also able to minimize or eliminate lateral deflection of the trim structure 32 and armrest assembly 30 when pushing or pulling on the pull-handle feature 28 during normal usage (depicted in FIG. 2B for illustrative purposes by hidden arrows F1).

FIG. 2C of the drawings provides a cross-sectional view of the vehicle door assembly 22 and energy-absorbing bracket system 60 taken along line 2-2 of FIG. 2A. The first flange portion 84 preferably extends across the upper peripheral edge of the planar portion 82 of the reaction plate member 80 in a continuous, uninterrupted manner. To this regard, a second section 87 of the first flange portion abuts against an underside or "b-side" surface 33 of the armrest assembly 30.

The characteristics of each bracket member 62, 64 e.g., individual and relative dimensions, orientations, gauges, and materials, are tunable to provide different predetermined levels of kinetic energy absorption and attenuation. For instance, longer, thicker support brackets made of high-strength low alloy steel may be implemented for larger vehicles that may be subjected to larger vertical and lateral loading conditions. In contrast, the dimensions, orientations, gauges, and materials can be selectively modified to vary the magnitude of resiliency and robustness, as well as the expected energy-absorbing capacity, of the energy-absorbing bracket system 60 for smaller vehicles.

According to preferred practice, the reaction plate member 80 is attached at a longitudinally rearward end (i.e., relative to axis A of vehicle 10 in FIG. 1) of the lower trim panel portion 40 such that the reaction plate member 80 and the first and second bracket members 62, 64 are positioned laterally adjacent a predetermined countermeasure or "occupant zone". An occupant zone (depicted for explanatory purposes with phantom lines 92 in FIG. 2) is an anthropometric parameter intended to represent the expected positioning of the torso of a vehicle occupant within the passenger compartment 14 relative to the seat assembly—e.g., the area between the clavicle and pelvis of the fifth percentile female to the 95th percentile male. The occupant zone 90 may also take into account such variables as seat height, depth and width; seat pan angle; backrest height and width; lumbar support height; and the angle between the seat and the back.

Figure 3:
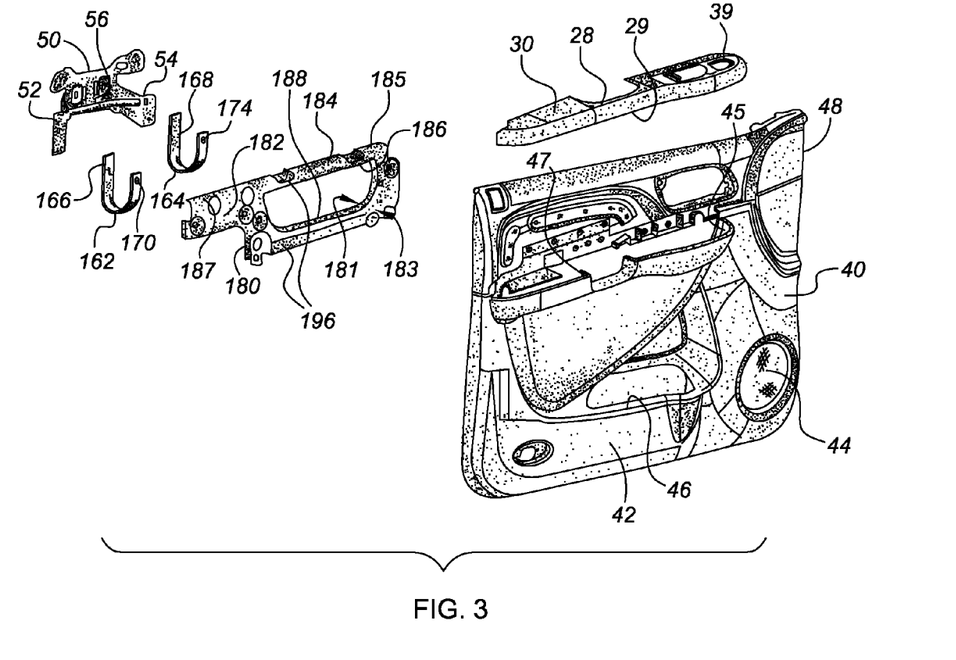
FIG. 3 is an exploded perspective view of an energy-absorbing bracket system in accordance with another embodiment of the present invention.

FIG. 3 is an exploded perspective view of an energy-absorbing bracket system 160 in accordance with an alternate embodiment of the present invention. The energy-absorbing bracket system 160 includes first and second bracket members 162 and 164, respectively. The first bracket member 162 has a U-shaped configuration, including a first generally vertical mounting portion 166 and a first leg member 170, which preferably extends inward relative to the vehicle 10 (FIG. 1) in an arcuate or looping manner from a bottom end of the mounting portion 166. The second bracket member 164 also has a U-shaped configuration, including a second generally vertical mounting portion 168 and a leg member 174, which preferably extends inward relative to the vehicle 10 (FIG. 1) in an arcuate or looping manner from opposing ends of the mounting portion 168.

Functioning in a manner synonymous to first and second bracket members 62, 64 of FIG. 2, each mounting portion 166, 168 of the energy-absorbing bracket system 160 of FIG. 3 is configured for operative attachment to the inboard surface 37 of the inner support panel 34. Specifically, the first and second mounting portions 166, 168 are respectively attached to the first and second stepped surfaces 52 and 54 of the mounting bracket 50. According to preferred practice, the first and second bracket members 162, 164 are longitudinally spaced from one another, and substantially parallel.

Also similar to the embodiment of FIG. 2, the first and second bracket members 162, 164 of FIG. 3 are configured to sustain a predetermined minimum vertical loading condition (e.g., arrow F2 of FIGS. 2B-C), and controllably deform under a predetermined threshold lateral loading condition (e.g., arrows F3 of FIGS. 2B-C). For example, first and second bracket members 162, 164 provide sufficient structural rigidity for normal, quasi-static loading purposes—e.g., to maintain at least 250 to 500 Newtons (N) vertical loading (e.g., F2) and 300N horizontal loading (e.g., F1), but will controllably deform or collapse under atypical or dynamic loading scenarios—e.g., a significant lateral crush force (e.g., F3). As such, a support bracket system according to the present design provides a completely integrated energy-absorbing system for vehicle door assemblies. In addition, an energy-absorbing system according to the present invention assists the armrest assembly 30 and trim structure 32 in deforming and, thus, absorbing kinetic energy in a controlled manner during dynamic lateral loading.

The energy-absorbing bracket system 160 also includes a reaction plate member 180 that is configured to mate with and/or attach to, and thereby reinforce the armrest assembly 30 and door trim assembly 32. The reaction plate member 180 includes a generally planar portion 182 with a first, outboard surface 181 opposing a second, inboard surface 183. The first and second bracket members 162, 164, namely leg members 170 and 174 are configured to abut against and attach to the first surface 181 of the reaction plate member 180 (e.g., via bolts 90 of FIG. 2C). In addition, the second surface 183 is dimensioned and configured to abut against, mate with, and attach to the trim panel assembly 32, namely inner surface 45 of the trim panel lower portion 40 (e.g., via heat stakes).

Ideally, the reaction plate member 180 consists essentially of a preformed single-piece metallic panel. However, the reaction plate member 180 may consist of several constituent components attached to one or both of the bracket members 162, 164. Furthermore, the structural characteristics (depth, width, height, number of apertures, etc.) of the reaction plate member 180 may be selectively altered depending upon the intended application of the energy-absorbing bracket system 160. In addition, the reaction plate member 180 may be strategically weakened to provide predetermined crush characteristics. For example, a plurality of weakening indentations, ridges, or slots 196 may be elongated along the inboard surface 183 of the planar portion 182 of the reaction plate member 180, each configured to weaken the planar portion 182 at preselected locations to thereby provide predetermined crush characteristics. Contrastingly, the reaction plate member 180 may include a plurality of structural features operatively configured to strengthen the planar portion 182 at preselected locations.

The reaction plate member 180 includes a first flange portion 184 extending from an upper peripheral edge of the planar portion 182. A first section 185 of the first flange portion 184 is configured abut against the b-side surface 31 of the internal cavity 29 of the pull-handle 28. The first flange portion 184 preferably extends across the upper peripheral edge of the planar portion 182 of the reaction plate member 180 in a continuous, uninterrupted manner. To this regard, a second section 187 of the first flange portion 184 is configured to abut against an underside or "b-side" surface 33 of the armrest assembly 30. The reaction plate member 180 also defines an aperture 186 with a second flange portion 188 extending from an inner peripheral edge thereof. The aperture 186 is oriented and dimensioned such that the second flange portion 188 of the reaction plate member 180 abuts against a generally horizontal portion 47 of the inner surface 45 of the lower trim panel portion 40. In so doing, the energy-absorbing bracket system 160 according to the present embodiment is able to limit vertical deflection of the pull-handle feature 28 and armrest assembly 30, and is also able to minimize or eliminate lateral deflection of the trim structure 32 and armrest assembly 30 when pushing or pulling on the pull-handle feature 28 during normal usage (e.g., hidden arrows F1 in FIG. 2B).

While the best modes for carrying out the present invention have been described in detail, those familiar with the art to which this invention relates will recognize various alternative designs and embodiments for practicing the invention within the scope of the appended claims.

The invention claimed is:

1. An energy-absorbing bracket system for use with a door assembly operatively attached to a motorized vehicle, the door assembly including an inner support panel with opposing inboard and outboard surfaces, a trim panel member, and an armrest assembly with a pull-handle or pull-cup defining an internal cavity therein, comprising:
    a first bracket member having a first generally vertical mounting portion configured for operative attachment to the inboard surface of the inner support panel, and a first leg member extending inward from said first mounting portion and configured to operatively engage an inner surface of the trim panel member; and
    a second bracket member detached and spaced from said first bracket member and having a second generally vertical mounting portion configured for operative attachment to the inboard surface of the inner support panel, and a third leg member extending inward from said second mounting portion and configured to operatively engage said inner surface of the trim panel member;
    wherein said first and second bracket members are configured to sustain a predetermined minimum vertical loading condition and controllably deform under a predetermined threshold lateral loading condition to absorb and attenuate kinetic energy resulting therefrom.

2. The energy-absorbing bracket system of claim 1, wherein said first bracket member further includes a second leg member extending inward from said first mounting portion and configured to operatively engage an inner surface of the trim panel member; and wherein said second bracket member further includes a fourth leg member extending inward from said second mounting portion and configured to operatively engage said inner surface of the trim panel member.

3. The energy-absorbing bracket system of claim 1, wherein said leg members extend inward in an arcuate manner from opposing ends of respective ones of said first and second vertical mounting portions.

4. The energy-absorbing bracket system of claim 1, wherein said first and second bracket members are substantially parallel to one another and positioned laterally adjacent a predetermined occupant zone.

5. The energy-absorbing bracket system of claim 1, wherein said first and second bracket members are configured to be variably tunable to thereby provide different predetermined levels of kinetic energy absorption and attenuation.

6. The energy-absorbing bracket system of claim 1, wherein said first and second bracket members each consists essentially of a single-piece elongated metallic member.

7. The energy-absorbing bracket system of claim 1, further comprising:
a reaction plate member having a generally planar portion with opposing first and second surfaces, said leg members being operatively attached to said first surface of said reaction plate member, and said second surface being configured to mate with said inner surface of the trim panel member.

8. The energy-absorbing bracket system of claim 7, wherein said planar portion includes a first flange portion extending from an upper peripheral edge thereof, wherein a first section of said first flange portion abuts against a b-side surface of the internal cavity of the pull-handle or pull-cup.

9. The energy-absorbing bracket system of claim 8, wherein a second section of said first flange portion abuts against an underside surface of the armrest assembly.

10. The energy-absorbing bracket system of claim 9, wherein said reaction plate defines at least one aperture therethrough with a second flange portion extending from an inner peripheral edge thereof, wherein said second flange portion abuts against a generally horizontal portion of the inner surface of the trim panel member.

11. The energy-absorbing bracket system of claim 7, wherein said reaction plate member is configured to attach at a longitudinally rearward end of said trim panel member laterally adjacent a predetermined occupant zone.

12. The energy-absorbing bracket system of claim 7, wherein said reaction plate member includes a plurality of structural features operatively configured to weaken or strengthen said planar portion at preselected locations.

13. The energy-absorbing bracket system of claim 7, wherein said reaction plate member consists essentially of a preformed single-piece metallic panel.

14. The energy-absorbing bracket system of claim 1, further comprising:
a mounting bracket intermediate the inner support panel and said first and second bracket members and configured for operatively attaching said first and second bracket members to the inboard surface of the inner support panel.

15. A door assembly operatively attached to a body of a motorized vehicle to selectively transition from a substantially closed position to a generally open position, comprising:
an inner support panel with opposing inboard and outboard surfaces;
a trim panel member operatively attached to said inner support panel;
an armrest assembly disposed vertically adjacent said trim panel member and elongated along said inner support panel and extending inward therefrom, said armrest assembly having a pull-handle defining an internal cavity therein;
a reaction plate member having a generally planar portion with opposing first and second surfaces, said second surface operatively attached to an inner surface of said trim panel member;
a first bracket member having a first generally vertical mounting portion with first and second leg members extending inward in an arcuate manner from opposing ends thereof, said first and second leg members being operatively attached to said first surface of said reaction plate member;
a second bracket member longitudinally spaced from and substantially parallel to said first bracket member and having a second generally vertical mounting portion with third and fourth leg members extending inward in an arcuate manner from opposing ends thereof, said third and fourth leg members being operatively attached to said first surface of said reaction plate member; and
a mounting bracket intermediate said inner support panel and said first and second bracket members, said mounting bracket operatively attaching said first and second vertical mounting portions to said inboard surface of said inner support panel;
wherein said first and second bracket members are configured to sustain a predetermined minimum vertical loading condition and controllably deform under a predetermined threshold lateral loading condition to absorb and attenuate kinetic energy resulting therefrom.

16. The door assembly of claim 15, wherein said planar portion includes a first flange portion extending from an upper peripheral edge thereof, wherein a first section of said flange portion abuts against a b-side surface of said pull-handle internal cavity and a second section of said flange portion abuts against an underside surface of said armrest assembly.

17. The door assembly of claim 15, wherein said reaction plate defines at least one aperture therethrough with a second flange portion extending from an inner peripheral edge thereof, wherein said second flange portion abuts against a generally horizontal portion of said inner surface of said trim panel member.

18. The door assembly of claim 15, wherein said reaction plate member is attached at a longitudinally rearward end of said trim panel member such that said reaction plate member and said first and second bracket members are positioned laterally adjacent a predetermined occupant zone.

19. The door assembly of claim 15, wherein said first and second bracket members are configured to be variably tunable to thereby provide different predetermined levels of kinetic energy absorption and attenuation.

20. A motorized vehicle having a vehicle body, comprising:
a door assembly operatively attached to the vehicle body to selectively transition from a substantially closed position to a generally open position, said door assembly including an inner support panel with opposing inboard and outboard surfaces;
an armrest assembly operatively attached to said door assembly inner support panel and extending inward therefrom, said armrest assembly having a pull-handle defining an internal cavity therein;
a trim panel member with an inner surface operatively attached to said door assembly inner support panel;
a reaction plate member having a generally planar portion with opposing first and second surfaces, said second surface operatively attached to said inner surface of said trim panel member, said planar portion including a flange portion extending from an upper peripheral edge thereof, wherein a first section of said flange portion abuts against a b-side surface of said pull-handle internal cavity and a second section of said flange portion abuts against an underside surface of said armrest assembly;
a first bracket member having a first generally vertical mounting portion with first and second leg members extending inward in an arcuate manner from opposing ends thereof to define a substantially C-shaped configuration, said first and second leg members being operatively attached to said first surface of said reaction plate member;
a second bracket member longitudinally spaced from and substantially parallel to said first bracket member and having a second generally vertical mounting portion with third and fourth leg members extending inward in an arcuate manner from opposing ends thereof to define a substantially C-shaped configuration, said third and fourth leg members being operatively attached to said first surface of said reaction plate member; and a mounting bracket intermediate said inner support panel and said first and second bracket members, said mounting bracket operatively attaching said first and second vertical mounting portions to said inboard surface of said inner support panel;

wherein said reaction plate member is positioned at a longitudinally rearward end of said trim panel member such that said reaction plate member and said first and second bracket members are positioned laterally adjacent a predetermined occupant zone; and wherein said first and second bracket members are configured to sustain a predetermined minimum vertical loading condition and controllably deform under a predetermined threshold lateral loading condition to absorb and attenuate kinetic energy resulting therefrom.

* * * * *